(12) United States Patent
Kuroda et al.

(10) Patent No.: US 10,861,201 B2
(45) Date of Patent: Dec. 8, 2020

(54) INFORMATION GENERATION SYSTEM, METHOD, AND COMPUTER PROGRAM PRODUCT

(71) Applicant: Kabushiki Kaisha Toshiba, Minato-ku (JP)

(72) Inventors: Akira Kuroda, Yokohama (JP); Hidenori Matsuzaki, Fuchu (JP); Nobuaki Tojo, Tachikawa (JP); Mayuko Koezuka, Ota (JP)

(73) Assignee: Kabushiki Kaisha Toshiba, Minato-ku (JP)

(*) Notice: Subject to any disclaimer, the term of this patent is extended or adjusted under 35 U.S.C. 154(b) by 690 days.

(21) Appl. No.: 15/045,933

(22) Filed: Feb. 17, 2016

(65) Prior Publication Data
US 2016/0358352 A1    Dec. 8, 2016

(30) Foreign Application Priority Data

Jun. 2, 2015  (JP) ................................. 2015-111843

(51) Int. Cl.
*G06T 11/20*    (2006.01)
*G09G 5/00*    (2006.01)
*G06F 3/0481*    (2013.01)

(52) U.S. Cl.
CPC .......... *G06T 11/206* (2013.01); *G06F 3/0481* (2013.01); *G09G 5/00* (2013.01); *G09G 2340/14* (2013.01)

(58) Field of Classification Search
CPC .......... G06T 11/206; G06F 7/023; G06F 4/06; G06F 7/08; G06F 7/10; G06F 16/14;
(Continued)

(56) References Cited

U.S. PATENT DOCUMENTS 4,823,272 A * 4/1989 Inselberg .................. G01S 7/22
701/120
5,257,345 A * 10/1993 Malm ..................... G06T 15/10
345/419

(Continued)

FOREIGN PATENT DOCUMENTS

| JP | 11-15895 A | 1/1999 |
| JP | 2004-532489 A | 10/2004 |
| JP | 2006-236280 A | 9/2006 |

OTHER PUBLICATIONS

"Test Link Open Source Test Management", TestLink Stable (1.9. 13—Stormbringer—Feb. 7, 2015), http://testlink.org/, Aug. 14, 2015, 1 Page.

(Continued)

*Primary Examiner* — Charles L Beard
(74) *Attorney, Agent, or Firm* — Oblon, McClelland, Maier & Neustadt, L.L.P.

(57) ABSTRACT

An information generation system includes: an acquisition unit to acquire a set of records, each f which indicates a correspondence relation between a setting condition and a processing result for each processing, a generation unit to generate display information in order generate a display image based on the set of records, and a control unit to control a display unit so as to display the display image based on the display information. The display image includes the first area and the second area. Setting condition axes are displayed on the first area. Processing result axes are displayed on the second area. Value objects indicating concrete values of the setting condition are displayed at the setting condition axes. Value objects indicating concrete values of the processing result are displayed at the processing result axes. Between the value objects, relation objects indicating correspondence relations are displayed.

18 Claims, 13 Drawing Sheets

(58) Field of Classification Search
CPC .... G06F 16/144; G06F 16/148; G06F 16/156; G06F 16/168; G06F 16/24; G06F 16/2423; G06F 16/2425; G06F 16/2428; G06F 16/245; G06F 16/16; G06F 3/0481; Y10S 707/99935; Y10S 707/99943; G09G 5/00; G09G 2340/14
See application file for complete search history.

(56) References Cited

U.S. PATENT DOCUMENTS

| | | | | |
|---|---|---|---|---|
| 5,450,326 | A * | 9/1995 | Black | H01L 22/20 257/E21.525 |
| 5,546,516 | A * | 8/1996 | Austel | G06T 11/206 345/440 |
| 5,781,906 | A * | 7/1998 | Aggarwal | G06F 16/2264 |
| 5,917,500 | A * | 6/1999 | Johnson | G06T 11/206 345/440 |
| 6,006,225 | A * | 12/1999 | Bowman | G06F 16/3325 |
| 6,032,145 | A * | 2/2000 | Beall | G06Q 30/0633 705/26.8 |
| 6,470,352 | B2 | 10/2002 | Yaginuma | G06F 16/283 |
| 6,477,538 | B2 * | 11/2002 | Yaginuma | G06F 16/283 |
| 6,484,162 | B1 * | 11/2002 | Edlund | G06F 16/2428 |
| 6,603,477 | B1 * | 8/2003 | Tittle | G01D 7/08 345/440 |
| 6,671,680 | B1 * | 12/2003 | Iwamoto | G06F 16/248 707/737 |
| 6,707,454 | B1 * | 3/2004 | Barg | G06F 17/246 345/440 |
| 6,750,864 | B1 * | 6/2004 | Anwar | G06T 11/206 345/440 |
| 6,857,877 | B1 * | 2/2005 | Watanabe | G06Q 10/06 434/219 |
| 6,879,325 | B1 * | 4/2005 | Brooks | G01D 7/02 345/440 |
| 6,996,536 | B1 * | 2/2006 | Cofino | G06Q 30/06 705/26.8 |
| 7,174,342 | B1 * | 2/2007 | Scheurich | G06Q 10/10 |
| 7,266,510 | B1 * | 9/2007 | Cofino | G06Q 30/02 705/26.1 |
| 7,283,664 | B2 * | 10/2007 | Magee | G06K 9/6253 382/165 |
| 7,574,454 | B2 * | 8/2009 | Lee | G06F 16/2465 |
| 7,672,924 | B1 * | 3/2010 | Scheurich | G06F 16/2423 707/999.002 |
| 7,698,686 | B2 * | 4/2010 | Carroll | G06F 11/3423 715/772 |
| 7,957,932 | B1 * | 6/2011 | Antanies | G05B 23/0216 702/179 |
| 8,132,101 | B2 * | 3/2012 | Buck | G06Q 50/22 715/708 |
| 8,195,426 | B1 * | 6/2012 | Antanies | G05B 23/0267 702/179 |
| 8,346,682 | B2 * | 1/2013 | Steed | G06T 11/206 706/11 |
| 8,396,834 | B2 * | 3/2013 | Bahadori | G06Q 30/02 707/640 |
| 8,487,930 | B2 * | 7/2013 | Navratil | G06T 11/206 345/440 |
| 8,973,141 | B2 * | 3/2015 | Rowland | H04L 63/20 726/23 |
| 9,037,273 | B2 * | 5/2015 | Mikkelsen | G05B 19/409 700/80 |
| 9,153,051 | B2 * | 10/2015 | Kumar Kn | G06T 11/206 |
| 9,418,455 | B1 * | 8/2016 | Wong | G06T 11/206 |
| 9,472,002 | B1 * | 10/2016 | Wong | G06F 9/00 |
| 9,754,394 | B2 * | 9/2017 | Matsuo | G06T 11/206 |
| 9,779,147 | B1 * | 10/2017 | Sherman | G06F 16/248 |
| 9,785,328 | B2 * | 10/2017 | Slawinski | G06F 3/04847 |
| 9,791,853 | B2 * | 10/2017 | Nishimura | G05B 19/41875 |
| 9,792,706 | B2 * | 10/2017 | Kuroda | G06T 11/206 |
| 9,804,726 | B1 * | 10/2017 | Joos | G06F 3/048 |
| 9,811,927 | B2 * | 11/2017 | Rowland | H04L 63/20 |
| 9,881,066 | B1 * | 1/2018 | Yousaf | G06F 16/248 |
| 9,922,435 | B2 * | 3/2018 | Nishimura | G06T 11/206 |
| 10,110,687 | B2 * | 10/2018 | Bahadori | G06F 11/3438 |
| 10,115,108 | B1 * | 10/2018 | Gendelev | G06Q 20/4016 |
| 10,459,938 | B1 * | 10/2019 | Agnew | G06F 16/26 |
| 10,459,939 | B1 * | 10/2019 | Agnew | G06F 16/248 |
| 10,510,117 | B1 * | 12/2019 | Romo | G06Q 40/06 |
| 2001/0049678 | A1 * | 12/2001 | Yaginuma | G06F 16/26 |
| 2003/0128212 | A1 * | 7/2003 | Pitkow | G06T 11/206 345/440 |
| 2004/0111679 | A1 * | 6/2004 | Subasic | G06F 30/3323 716/101 |
| 2004/0122601 | A1 * | 6/2004 | Shetty | G06T 11/206 702/35 |
| 2004/0148578 | A1 * | 7/2004 | McConaghy | G06F 30/36 716/102 |
| 2004/0267770 | A1 * | 12/2004 | Lee | G06F 16/2465 |
| 2005/0162423 | A1 * | 7/2005 | Goggin | G06T 11/206 345/440 |
| 2006/0061572 | A1 * | 3/2006 | Phelan | G06F 3/04847 345/440 |
| 2007/0005582 | A1 * | 1/2007 | Navratil | G06F 16/2428 |
| 2007/0211057 | A1 * | 9/2007 | Navratil | G06T 11/206 345/440 |
| 2008/0022239 | A1 * | 1/2008 | McConaghy | G06F 17/5022 702/81 |
| 2009/0024411 | A1 * | 1/2009 | Albro | G06F 19/322 705/2 |
| 2009/0027395 | A1 * | 1/2009 | Chuang | G06T 11/206 345/440 |
| 2009/0033664 | A1 * | 2/2009 | Hao | G06T 11/206 345/440 |
| 2010/0030734 | A1 * | 2/2010 | Chunilal | G06Q 10/00 707/770 |
| 2010/0049733 | A1 * | 2/2010 | Hill | G06F 16/2428 707/805 |
| 2010/0188427 | A1 * | 7/2010 | Chuang | G06Q 10/00 345/660 |
| 2010/0191678 | A1 * | 7/2010 | Steed | G06T 11/206 706/11 |
| 2011/0025717 | A1 * | 2/2011 | Gilmore | G06F 3/0481 345/661 |
| 2011/0077958 | A1 * | 3/2011 | Breitenstein | G06Q 50/22 705/2 |
| 2011/0087476 | A1 * | 4/2011 | Calvert | E21B 43/00 703/10 |
| 2012/0041576 | A1 * | 2/2012 | Mikkelsen | G05B 19/409 700/80 |
| 2012/0278321 | A1 * | 11/2012 | Traub | G06F 16/3331 707/736 |
| 2013/0041922 | A1 * | 2/2013 | Lewak | G06F 16/24573 707/780 |
| 2013/0076752 | A1 * | 3/2013 | Matsumoto | G06T 11/206 345/440 |
| 2013/0124542 | A1 * | 5/2013 | Lee | G06Q 50/01 707/751 |
| 2013/0144899 | A1 * | 6/2013 | Lee | G06Q 50/01 707/759 |
| 2013/0169646 | A1 * | 7/2013 | Yokobori | A61B 8/0891 345/440 |
| 2013/0187923 | A1 * | 7/2013 | Yoshimoto | G06T 11/206 345/440 |
| 2013/0198170 | A1 * | 8/2013 | Akita | G06F 16/903 707/722 |
| 2013/0198212 | A1 * | 8/2013 | Akita | G06F 16/2428 707/758 |
| 2013/0300743 | A1 * | 11/2013 | Degrell | G06T 11/206 345/440 |
| 2013/0325916 | A1 * | 12/2013 | Pitts | G06F 16/183 707/827 |
| 2014/0022256 | A1 * | 1/2014 | Carnes | A61B 5/02416 345/440.1 |
| 2014/0028682 | A1 * | 1/2014 | Omiya | G09G 5/363 345/440 |

(56) References Cited

U.S. PATENT DOCUMENTS

| | | | | |
|---|---|---|---|---|
| 2014/0055459 A1* | 2/2014 | Hiramatsu | G06T 11/206 | 345/440 |
| 2014/0092094 A1* | 4/2014 | Itoh | G06T 11/206 | 345/440 |
| 2014/0176555 A1* | 6/2014 | Kuo | G06T 11/206 | 345/440 |
| 2014/0188899 A1* | 7/2014 | Whitnah | G06Q 10/10 | 707/749 |
| 2014/0247267 A1* | 9/2014 | Kumar Kn | G16B 45/00 | 345/440 |
| 2014/0282871 A1* | 9/2014 | Rowland | H04L 63/20 | 726/3 |
| 2015/0007079 A1* | 1/2015 | Hansen | G06T 11/206 | 715/771 |
| 2015/0022528 A1* | 1/2015 | Tojo | G06T 11/206 | 345/440 |
| 2015/0026153 A1* | 1/2015 | Gupta | G06N 5/04 | 707/711 |
| 2015/0077428 A1* | 3/2015 | Stevens | G06T 11/206 | 345/589 |
| 2015/0097840 A1* | 4/2015 | Nishimura | G06T 11/206 | 345/443 |
| 2015/0153730 A1* | 6/2015 | Nishimura | G05B 19/41875 | 700/109 |
| 2015/0161338 A1* | 6/2015 | Scherrer | G06F 19/325 | 705/2 |
| 2015/0170384 A1* | 6/2015 | Matsumoto | G06T 11/60 | 345/629 |
| 2015/0199420 A1* | 7/2015 | Hansen | G06F 16/288 | 707/737 |
| 2015/0287225 A1* | 10/2015 | Rowland | H04L 63/20 | 345/440 |
| 2015/0301108 A1* | 10/2015 | Hamid | G01R 31/3177 | 714/724 |
| 2015/0346972 A1* | 12/2015 | Boekling | G06T 11/206 | 703/2 |
| 2015/0371418 A1* | 12/2015 | Laycock | G05B 19/0423 | 345/440 |
| 2016/0012154 A1* | 1/2016 | Ikejima | G06T 11/206 | 707/798 |
| 2016/0012620 A1* | 1/2016 | Kanada | G06K 9/52 | 345/440 |
| 2016/0012621 A1* | 1/2016 | Kanada | G06F 19/321 | 345/440 |
| 2016/0018961 A1* | 1/2016 | Williams | G06F 3/0484 | 715/772 |
| 2016/0021727 A1* | 1/2016 | Nagai | G06F 19/3481 | 378/98 |
| 2016/0071021 A1* | 3/2016 | Raymond | G06F 15/76 | 712/28 |
| 2016/0092530 A1* | 3/2016 | Jakubiak | G06F 17/30572 | 715/202 |
| 2016/0098173 A1* | 4/2016 | Slawinski | G06F 3/04847 | 715/739 |
| 2016/0103872 A1* | 4/2016 | Prophete | G06F 16/2428 | 707/722 |
| 2016/0124587 A1* | 5/2016 | Covington | G06F 3/0482 | 345/440 |
| 2016/0124821 A1* | 5/2016 | Klein | G06F 11/0766 | 714/4.4 |
| 2016/0162583 A1* | 6/2016 | Maddocks | G06F 16/9535 | 707/722 |
| 2016/0210337 A1* | 7/2016 | Constandt | G16B 99/00 | |
| 2016/0210765 A1* | 7/2016 | Nishimura | G06T 11/206 | |
| 2016/0224618 A1* | 8/2016 | Robichaud | G06F 16/00 | |
| 2016/0231900 A1* | 8/2016 | Meaney | G06F 3/04842 | |
| 2016/0249031 A1* | 8/2016 | Nakamura | H04N 9/73 | |
| 2016/0253828 A1* | 9/2016 | Nishimura | G06T 11/206 | 345/592 |
| 2016/0284109 A1* | 9/2016 | Nishimura | G06T 11/206 | |
| 2016/0306806 A1* | 10/2016 | Fackler | G06F 17/3056 | |
| 2016/0321398 A1* | 11/2016 | Majumdar | G06F 19/26 | |
| 2016/0358351 A1* | 12/2016 | Matejka | G06T 11/206 | |
| 2016/0359701 A1* | 12/2016 | Pang | H04L 41/16 | |
| 2017/0014090 A1* | 1/2017 | Tsugo | G16H 40/63 | |
| 2017/0032017 A1* | 2/2017 | Morinaga | G06K 9/6247 | |
| 2017/0039244 A1* | 2/2017 | Gauthier | G06T 11/206 | |
| 2017/0049314 A1* | 2/2017 | Nakagawa | A61B 3/10 | |
| 2017/0115862 A1* | 4/2017 | Stratton | A01D 41/1271 | |
| 2017/0124273 A1* | 5/2017 | Huang | G06F 19/3406 | |
| 2017/0148195 A1* | 5/2017 | Bak | G06K 9/6218 | |
| 2017/0148196 A1* | 5/2017 | Muraoka | G06F 13/00 | |
| 2017/0177201 A1* | 6/2017 | Disdero | G06F 17/30554 | |
| 2017/0200294 A1* | 7/2017 | Hirano | G01J 1/4257 | |
| 2017/0236314 A1* | 8/2017 | Ruble | G06T 3/40 | 345/592 |
| 2017/0262506 A1* | 9/2017 | Sharma | G06F 17/30498 | |
| 2017/0288989 A1* | 10/2017 | Sinha | G06F 16/35 | |
| 2017/0300346 A1* | 10/2017 | Motohashi | G06F 9/453 | |
| 2018/0025116 A1* | 1/2018 | Carrington | G16H 50/30 | 705/3 |
| 2018/0032570 A1* | 2/2018 | Miller | G06F 16/2425 | |
| 2018/0046935 A1* | 2/2018 | Amershi | G06N 7/005 | |
| 2018/0060469 A1* | 3/2018 | Morgan | G06F 17/5009 | |
| 2018/0064403 A1* | 3/2018 | Konta | A61B 5/055 | |
| 2018/0081951 A1* | 3/2018 | Kuroda | G06F 11/3692 | |
| 2018/0101294 A1* | 4/2018 | Kuroda | G06F 3/04847 | |
| 2018/0144534 A1* | 5/2018 | Lee | G06T 15/00 | |
| 2018/0181984 A1* | 6/2018 | Sato | G06Q 30/02 | |
| 2018/0191988 A1* | 7/2018 | Takahashi | H04N 5/44591 | |
| 2018/0253874 A1* | 9/2018 | Nomamoto | G06Q 50/04 | |
| 2018/0268580 A1* | 9/2018 | Nomamoto | G06F 3/0482 | |
| 2018/0309794 A1* | 10/2018 | Eskridge | H04L 63/20 | |
| 2018/0350000 A1* | 12/2018 | Asllan | G06Q 40/04 | |
| 2018/0365871 A1* | 12/2018 | Nahman | G06T 11/206 | |
| 2019/0012553 A1* | 1/2019 | Maruchi | G06F 15/18 | |
| 2019/0026926 A1* | 1/2019 | Crespo-Diaz | G01N 15/1429 | |
| 2019/0026928 A1* | 1/2019 | Fainshtein | G01N 15/02 | |
| 2019/0214131 A1* | 7/2019 | Bak | G16H 10/60 | |
| 2019/0318516 A1* | 10/2019 | Tanaka | G06F 30/00 | |
| 2020/0111018 A1* | 4/2020 | Golovin | G06N 5/003 | |
| 2020/0167691 A1* | 5/2020 | Golovin | G06N 7/005 | |
| 2020/0184692 A1* | 6/2020 | Yang | G05B 19/418 | |

OTHER PUBLICATIONS

"TestLink" (http://sourceforge.net/p/testlink/wiki/Home/) downloaded 2019.

* cited by examiner

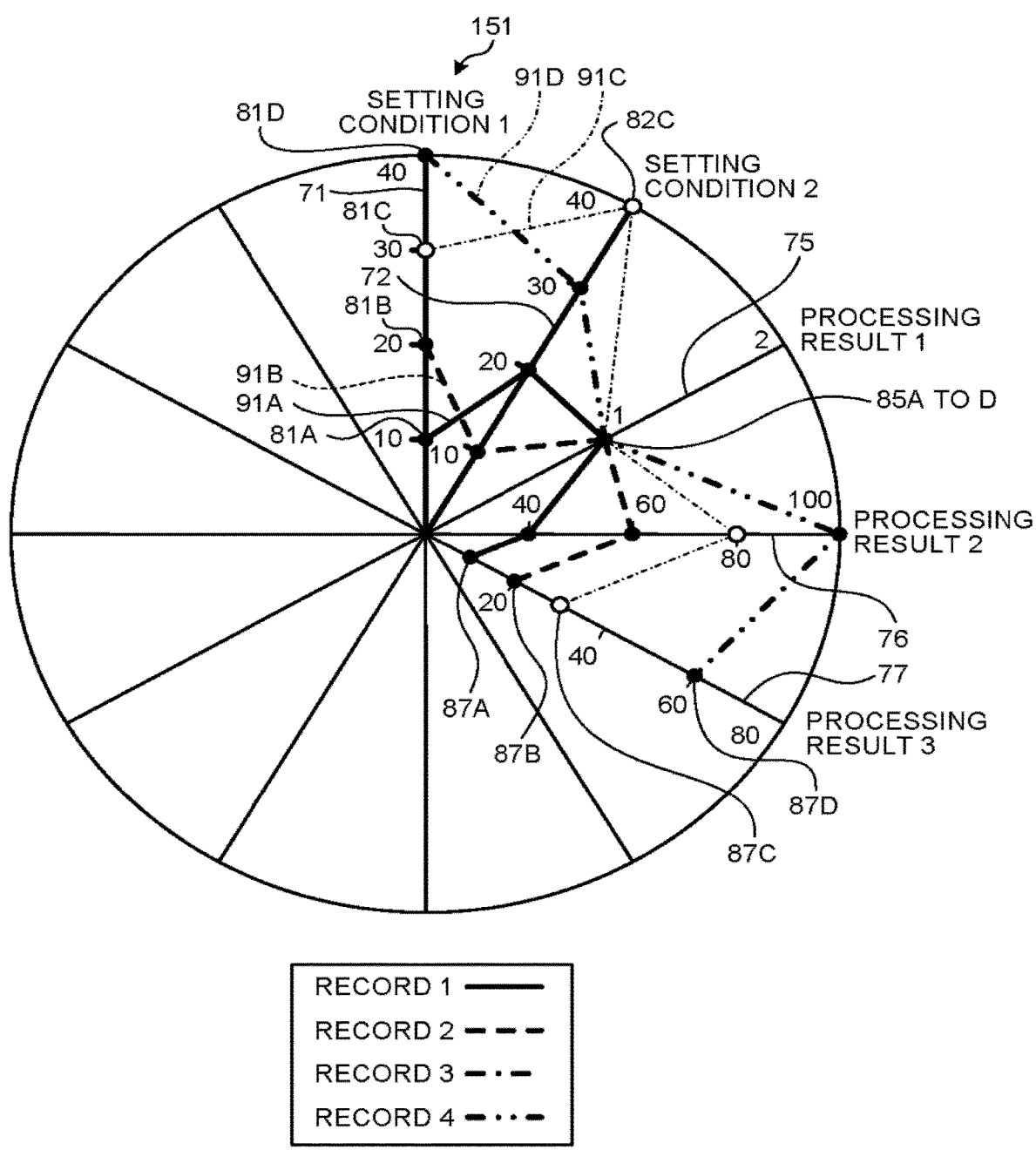

INFORMATION GENERATION SYSTEM, METHOD, AND COMPUTER PROGRAM PRODUCT

CROSS-REFERENCE TO RELATED APPLICATION

This application is based upon and claims the benefit of priority from Japanese Patent Application No. 2015-111843, filed on Jun. 2, 2015; the entire contents of which are incorporated herein by reference.

FIELD

Embodiments described herein relate generally to an information generation system, a method, and a computer program product therefor.

BACKGROUND

As an assisting tool for software test, a system to visually represent a processing result of software (program) relative to a specific setting condition is utilized. For example, there is a system in which a processing result corresponding to each setting condition is represented by a bar chart or the like when a user inputs the setting condition. Further, there is a device that visually represents a plurality of events (tasks) generated by execution of a program.

According to a system in the related arts, a correspondence relation between a setting condition and a processing result is displayed for each setting condition when a test result is displayed. In other words, in the case of performing tests multiple times by changing the setting conditions, a plurality of charts is created in accordance with the number of times of the tests. Therefore, in the case of comparing a plurality of test results, a user needs to compare the plurality of charts, and it is difficult to correctly grasp changes of the correspondence relation between the setting conditions and the processing results.

BRIEF DESCRIPTION OF THE DRAWINGS

FIG. 6 is a flowchart illustrating an exemplary processing flow by the information generation system according to the second embodiment;

FIG. 15 is a diagram illustrating an exemplary display image according to a fifth embodiment.

DETAILED DESCRIPTION

First Embodiment

Figure 1:
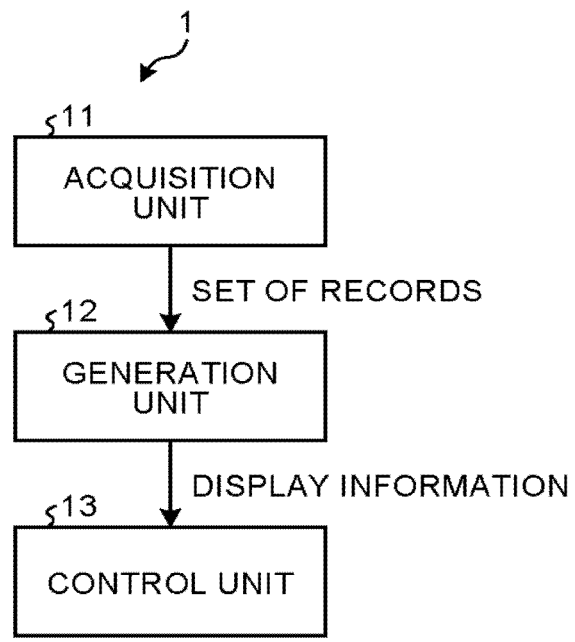
FIG. 1 is a diagram illustrating a functional configuration of an information generation system according to a first embodiment.

FIG. 1 is a diagram illustrating a functional configuration of an information generation system 1 according to a first embodiment. The information generation system 1 is a system to generate information related to processing a target module.

The target module is a module to output a processing result relative to a specific setting condition. The target module may be, for example, hardware that executes predetermined calculation processing by one or more integrated circuit(s) (IC), or software (program) that controls one or more processor(s).

As the processing to be performed in the target module, test processing may be assumed, for example. The test processing is processing to acquire information in order to determine whether the target module properly executes processing. A correspondence relation between a setting condition and a processing result is acquired by the t processing. The setting condition is information related to a configuration of the target module, for example. In the case where the target module is hardware, the setting condition may be, for example, the number of cores, the number of memories, an operation frequency of the core, and so on. In the case where the target module is software, the setting condition may be, for example, the number of threads, the number of execution options, and so on. The processing result Is information indicating a result of execution and simulation of the target module. In the case where the target module ft hardware, the processing result may be, for example, an output value (calculation result) by execution or simulation, a power consumption amount, the number of memory accesses, an execution performance value, and so on. In the case where the target module is software, the processing result may be, for example, an output value (calculation result) by execution or simulation, an execution performance value, and so on. A plurality of correspondence relations can be acquired by performing test processing multiple times by changing the setting conditions. A concrete method to perform the test processing is not particularly limited, and it is possible to use a method used in known performance test, function test, and so on. Meanwhile, the processing of the target module is not limited to the test processing, and may be processing of the target module in normal operation, for example. In the following embodiment, the case where the processing of the target module is the test processing will be described.

The information gene ion system 1 includes an acquisition unit 11, a generation unit 12, and a control unit 13.

The acquisition unit 11 acquires a set of records indicating, for each t processing, a correspondence relation between a setting condition and a processing result obtained from a result of the test processing. The set of records will be described in detail later by using, for example, FIG. 4. The acquisition unit 11 can be implemented by using, for example, a central processing unit (CPU), a program to the same, and a logic circuit, and so on.

The generation unit 1 generates, based on the set of records, display information in order to generate a display image to visually represent the correspondence relation for each test processing. The display image will be described in detail later by using, for example, FIG. 6. The generation unit 12 can be implemented by using, for example, a CPU, program to control the same, a logic circuit, and so on.

The control unit 13 controls a display unit such that the display image is displayed based on the display information generated by the generation unit 12. The display unit is, for example, a display of a computer and the like. The control unit 13 can be implemented by using, for example, a CPU, a program to control the same, a logic circuit, and so on.

Figure 2:
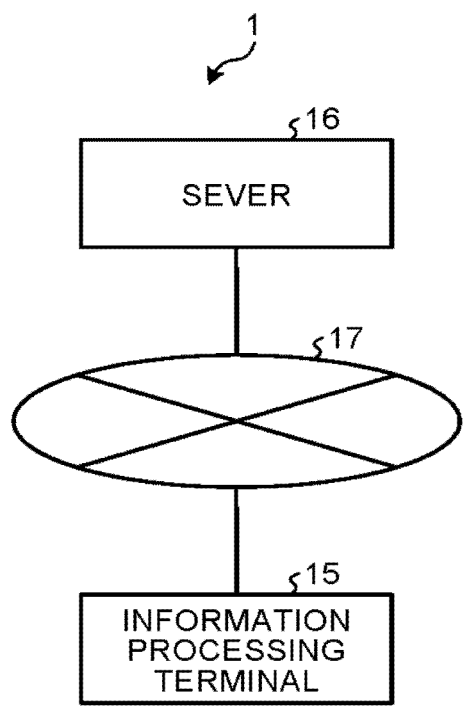
FIG. 2 is a diagram illustrating an exemplary hardware configuration of the information generation system.

FIG. 2 is a diagram illustrating an exemplary hardware configuration of the information generation system 1. The information generation system 1 includes an information processing terminal 15, a server 16, and a network 17. The information processing terminal 15 is, for example, a personal computer (PC), a tablet, a smartphone, and the like used by a user. The server 16 is, for example, a server computer and the like controlled by an administrator of the information generation system 1. The information processing terminal 15 and the server 16 are connected via the network 17 such as the Internet. Preferably, the server 16 constitutes at least a part of the generation unit 12 (executes at least a part of the processing to generate the display information). Further, preferably, the display unit to display the display image is a display of the information processing terminal 15.

Figure 3:
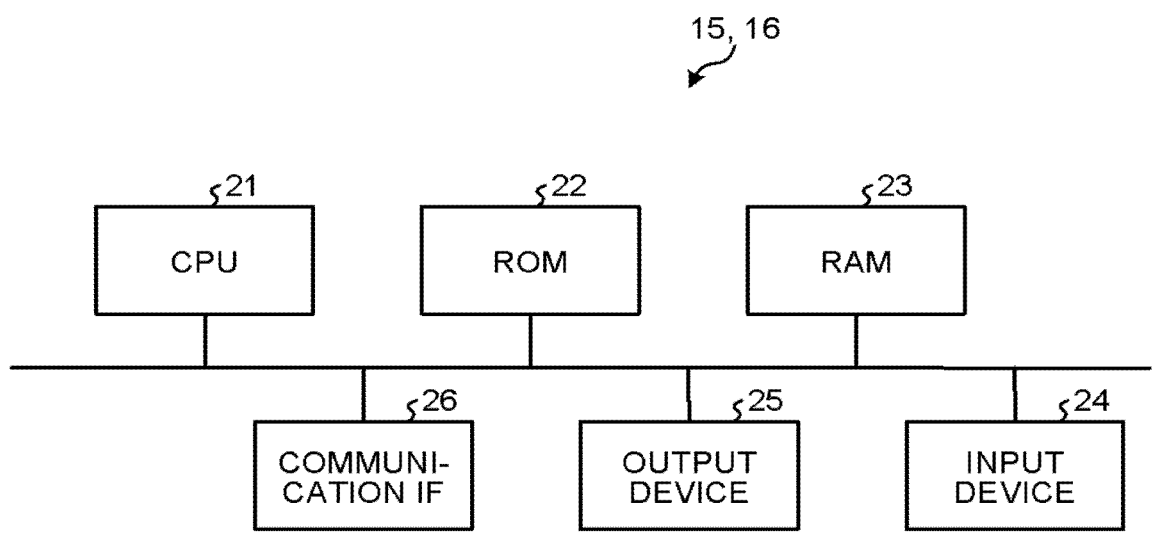
FIG. 3 is a diagram illustrating an exemplary internal configuration of an information processing terminal and that of a server.

FIG. 3 is a diagram illustrating an exemplary internal configuration of the information processing terminal 15 and that of the server 16. The information processing terminal 15 and the server 16 each include a CPU 21, a read only memory (ROM) 22, a random access memory (RAM) 23, an input device 24, an output device 25, and a communication interface (IF) 26. The CPU 21 performs predetermined calculation processing in accordance with a program stored in the ROM 22 and the like, using the RAM 23 as a working area. The input device 24 is a device to input information from the outside, and is a keyboard, a mouse, a touch panel, etc., for example. The output device 25 is a device to output information generated inside to the outside, and is a display, a printer, etc., for example. The communication IF 26 is a device to enable information exchange with the outside via the network 17.

Note that the hardware configurations illustrated in FIGS. 2 and 3 are examples, and the information generation system 1 can be implemented by various hardware configurations. For example, the acquisition unit 11, generation unit 12, and control unit 13 can also be implemented by a single general-purpose computer, or a dedicated device in which a processor is equipped. Further, the acquisition unit 11, generation unit 12, and control unit 13 can also be implemented by connecting a plurality of computers via an intranet.

Further, in FIG. 1, the acquisition unit 11, generation unit 12, and control unit 13 which are most basic functional blocks of the information generation system 1 are sequentially connected in order of processing, but the embodiment is not limited thereto. For example, there may be a configuration in which following three configurations are combined: a configuration in which the respective functional blocks cooperatively perform operation in parallel, a configuration in which the order of functional blocks are switched, and a configuration including one functional block divided into a plurality of functional block.

A program to implement the functions of the information generation system 1 can be provided by being recorded in an installable format file or an executable format file in a computer-readable recording medium such as a CD-ROM, a flexible disk (FD), a CD-R, and a DVD. Further, the program may also be provided by being downloaded to a predetermined computer from a predetermined storage medium connected to the network, or may also be provided to a predetermined information processor by being preliminarily incorporated into the ROM or the like. Also, the program may be formed of a plurality of modules that implements the functions of the above-described acquisition unit 11, generation unit 12, and control unit 13.

Further, the respective functions of the acquisition unit 11, generation unit 12, and control unit 13 may be implemented by a program executed by the CPU 21, may be implemented by operation of the hardware such as an IC, or may be implemented by combination thereof.

Figure 4:
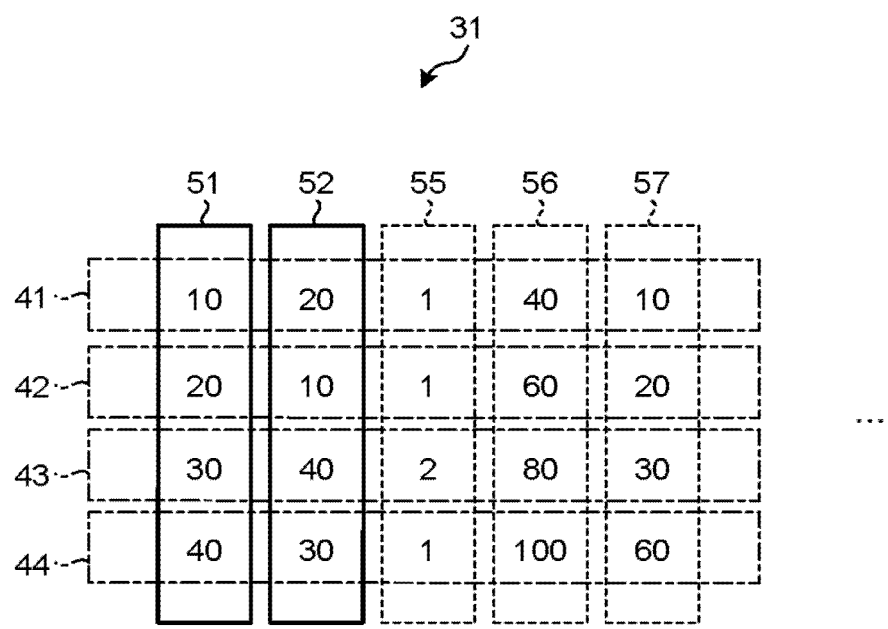
FIG. 4 is a diagram illustrating an exemplary set of records.

FIG. 4 is a diagram illustrating an exemplary set of record 31. The set of records 31 according to the present example includes a first record 41, a second record 42, a third record 43, and a fourth record 44. The respective records 41 to 44 indicate correspondence relations between setting conditions 51, 52 and processing results 55 to 57 in a first test processing. The respective records 41 to 44 according to the present example includes the first setting condition 51, second setting condition 52, first processing result 55, second processing result 56, and third processing result 57. In other words, in the present example, three kinds of the processing results 55 to 57 are obtained relative to two kinds of the setting conditions 51, 52 in the first test processing.

The setting conditions 51, and the processing results 55 to 57 are divided by the kinds. For example, there may be a case where a kind of the first setting condition 51 is "the number of cores" and a kind of the second setting condition 52 is "the number of memory". In this case, a concrete value of the first setting condition 51 (number of cores) is "10" and a concrete value of the second setting condition 52 (number of memories) is "20" in the first record 41. Further, there may be a case where a kind of the first processing result 55 is an "output value", a kind of the second processing result 56 is a "power consumption amount", and a kind of the third processing result 57 is "the number of memory accesses". In this case, a concrete value of the first processing result 55 (output value) is "1", a concrete value of the second processing result 56 (power consumption amount) is "40", and a concrete value of the third processing result 57 (number of accesses) is "10" in the first record 41. Note that the concrete values are not limited to numerical values, and may be characters, signs, and so on.

Figure 5:
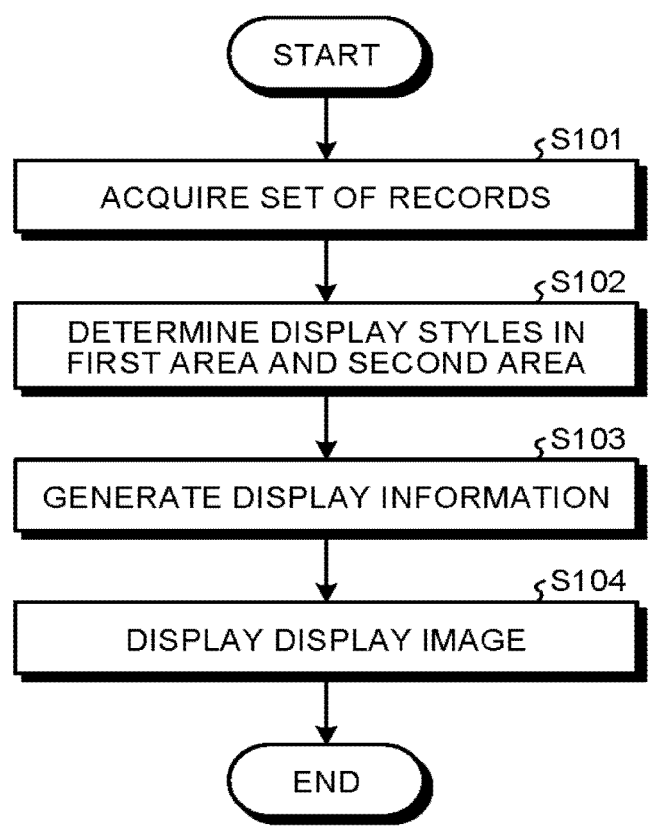
FIG. 5 is a flowchart illustrating an exemplary processing flow by the information generation system according to the first embodiment.

FIG. 5 is a flowchart illustrating an exemplary processing flow by the information generation system 1 according to the first embodiment. First, the acquisition unit 11 acquires a set of records 31 (S101). This acquiring processing is supposed to be performed by an appropriate method by using a device included in an adopted hardware configuration, but the acquiring processing may be implemented in following manners, for example: the server 16 receives data related to the set of records 31 from the information processing terminal 15 via the network 17, or receives the data from another information processor not illustrated, or data is directly input to the server 16. Next, the generation unit 12 determines, based on the set records 31, display styles in a first area and a second area described later (S102).

Figure 6:
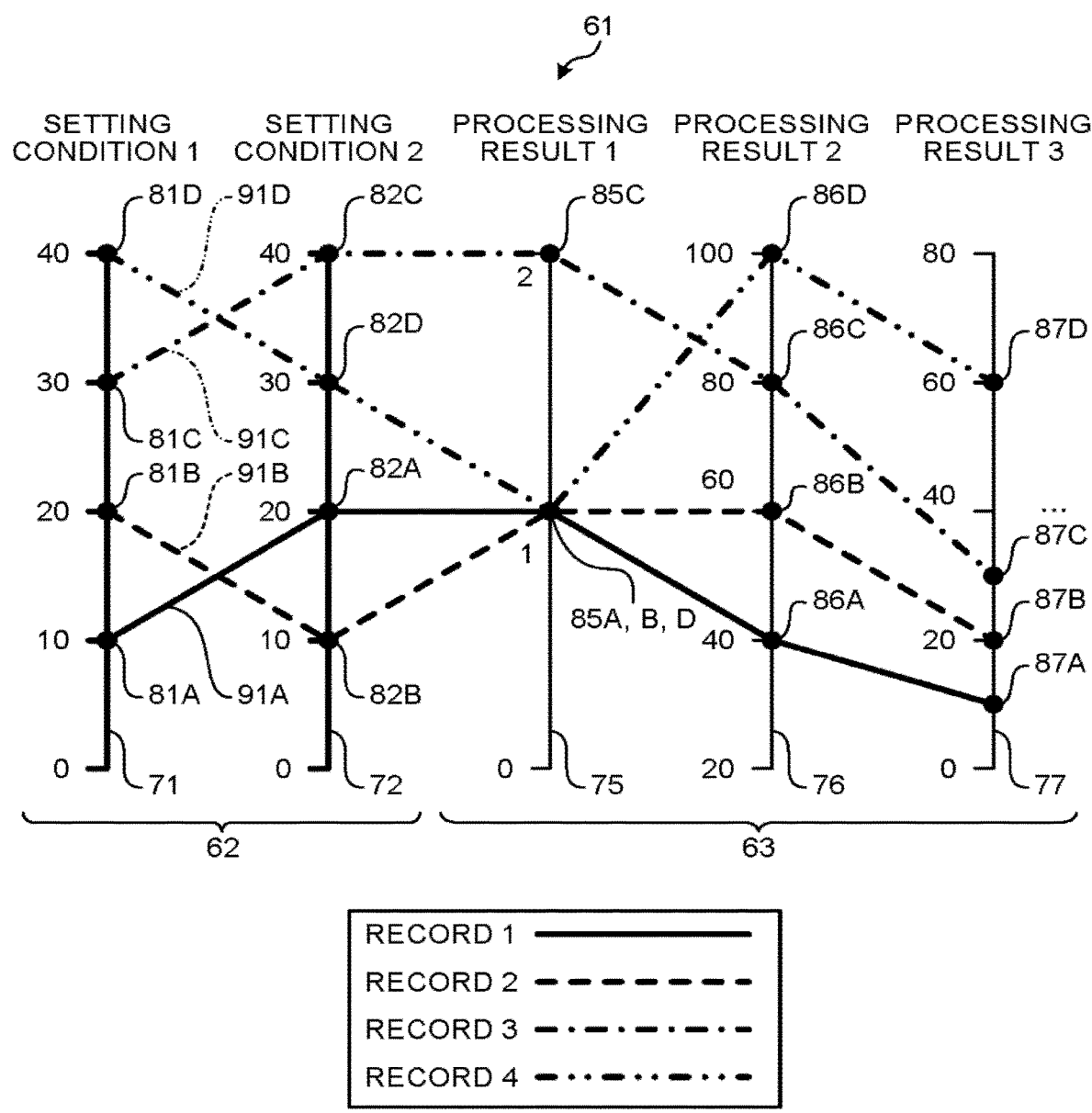
FIG. 6 is a diagram illustrating an exemplary display image according to the first embodiment.

FIG. 6 is a diagram illustrating an exemplary display image 61 according to the first embodiment. The display image 61 is a parallel coordinate plot in which a plurality of axes 71, 72, 75 to 77 is displayed in parallel. The display image 61 includes a first area 62 and a second area 63. The first area 62 is an area to display the setting conditions. The second area 63 is an area to display the processing results.

In the first area 62, the first setting condition axis 71 and the second setting condition axis 72 are displayed. The first setting condition axis 71 corresponds to the first setting condition 51 illustrated in FIG. 4. The second setting condition axis 72 corresponds to the second setting condition 52. In other words, the first setting condition axis 71 and the second setting condition axis 72 are provided for the respective kinds of the setting conditions described above. On the first setting condition axis 71, plot points (value objects) 81A, 81B, 81C, 81D corresponding to respective values of the first setting condition 51 illustrated in FIG. 4 are displayed. On the second setting condition axis 72, plot points 82A, 82B, 82C, 82D corresponding to the respective concrete values of the second setting condition 52 are displayed.

In the second area 63, a first processing result ax a second processing result axis 76, and a third processing result axis 77 are displayed. The first processing result axis 75 corresponds to the first processing result illustrated in FIG. 4. The second processing result axis 76 corresponds to the second processing result 56. The third processing result axis 77 corresponds to the third processing result 57. In other words, the first processing result axis 75, second processing result axis 76, and third processing result axis 77 are provided for the respective kinds of the processing results described above. On the first processing result axis 75, plot points 85A, 85B, 85C, 85D corresponding to the respective concrete values of the first processing result 55 illustrated in FIG. 4 are displayed. On the second processing result axis 76, plot points 86A, 86B, 86C, 86D corresponding to the respective concrete values of the second processing result 56 are displayed. On the third processing result axis 77, plot points 87A, 87B, 87C, 87D corresponding to the respective concrete values of the third processing result 57 are displayed.

Note that the above plot points 81A to 87D are examples of the value objects indicating the respective concrete values. As far as the respective concrete values can be appropriately represented, images of various kinds of forms can be used instead of the plot points 81A to 87D.

According to the display image 61 according to present example, four connection lines (relation objects) 91A, 91B, 91C, 91D corresponding to the respective records 41 to 44 illustrated in FIG. 4 are displayed. The first connection line 91A indicated by a solid line corresponds to the first record 41 (record 1), and connects the plot points 81A, 82A, 85A, 86A, 87A. The second connection line 91B indicated by a dotted line corresponds to the second record 42 (record and connects the plot points 81B, 82C, 85B, 86B, 87B. The third connection line 91 indicated by a dot-and-dash line corresponds to the third record 43 (record 3), and connects the plot points 81C, 82C, 85C, 86C, 87C. The fourth connection line 91D indicated by dashed-two dotted line corresponds to the fourth record 44 (record 4), and connects the plot points 81C, 82C, 85D, 86D, 87D.

Step S102 described above is a step to determine display styles of images included in the first area 62 and the second area 63 so as to make these areas identifiable. According to the present example, thicknesses of the lines of the first setting condition axis 71 and second setting condition axis 72 are thicker than thicknesses of the lines of the first processing result axis 75, second processing result axis 76, and third processing result axis 77. For example, the generation unit 12 thus determines the display style in the first area 62 and the display style of the second area 63. The display styles are not limited to the present example, and differentiation can be achieved by line types, colors, brightness, blinking, etc., for example. The processing to determine the display style is not particularly limited, and may be performed based on setting information preliminarily stored in a memory of a computer, or may be performed in accordance with selecting operation by a user, for example.

Referring back to the flowchart in FIG. 5, the generation unit 12 generates display information based on the determined display styles in the first area 62 and the second area 63 (S103). The display information is the information to generate the display image 61 and specify, for example, display positions, sizes, etc. of the setting condition axes 71, 72, processing result axes 75 to 77, plot points 81A to 87D, connection lines 91A to 91D, and so on. Next, the control unit 13 controls the display unit (for example, display of the information processing terminal 15) based on the display information, thereby displaying the display image 61 on the display unit (S104).

According to the information generation system 1 of the present embodiment, it is possible to generate the display image 61 that clearly represents, by one graph, the correspondence relations between the setting conditions 51, 52 and the processing results 55 to 57 of the respective records 41 to 44. As a result, even in the case of performing the test processing multiple times by changing the setting conditions, the correspondence relations between the setting conditions and the processing results can be correctly and easily grasped.

In the following, other embodiments will be described with reference to the drawings, but components providing functions and effect same as or equivalent to the above-described first embodiment will be denoted by the same reference signs, and a description therefor may be omitted.

Second Embodiment

Figure 7:
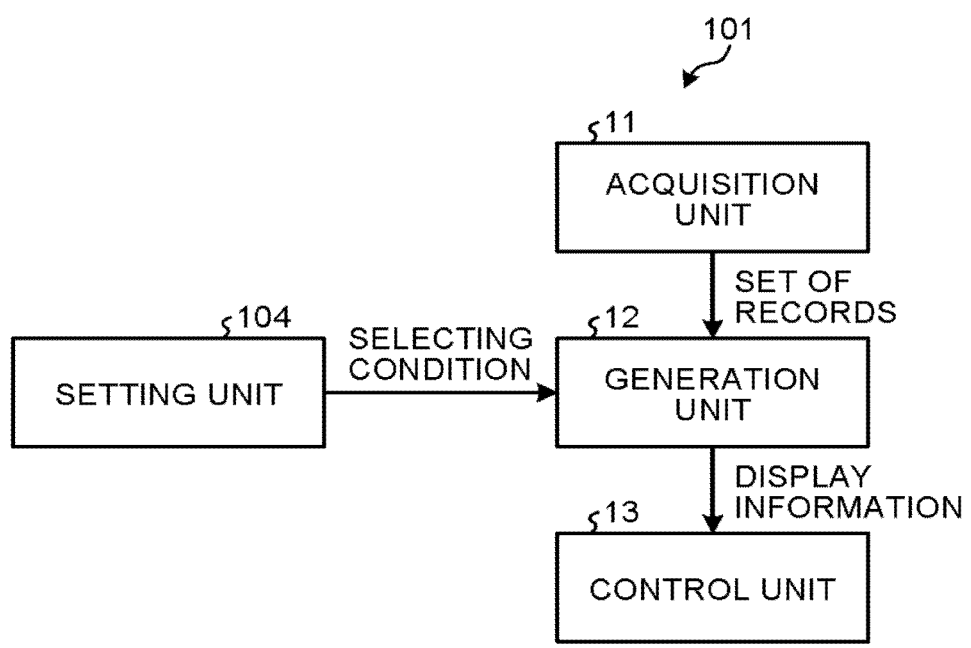
FIG. 7 is a diagram illustrating an exemplary functional configuration of an information generation system according to a second embodiment.

FIG. 7 is a diagram illustrating an exemplary functional configuration of an information generation system 101 according to a second embodiment. The information generation system 101 includes a setting unit 104 in addition to a configuration of an information generation system 1 illustrated in FIG. 1.

The setting unit 104 sets a selecting condition to make search refinement to at least either one of concrete values of setting conditions 51, 52 and concrete values of processing results 55 to 57. A generation unit 12 generates display information based on a set of records 31 and the selecting condition. The selecting condition may be a condition such as "the concrete value of the second setting condition 52 is 30 or less", for example. In this case, according to the set of records 31 illustrated in FIG. 4, a first record 41 (concrete value 20), a second record 42 (concrete value 10), and a fourth record 44 (concrete value 30) comply with the selecting condition, and a third record 43 (concrete value 40) does not comply with the selecting condition. The selecting condition can also be set for the processing result 55 to 57 in the same manner.

The setting unit 104 can be implemented by using, for example, a CPU 21, a program to control the same, and a logic circuit, and so on. Setting processing for the selecting condition is supposed to be performed by using an appropriate device included in an adopted hardware configuration, but it is assumed that the setting processing may be performed in following manners: a user inputs a value and the like to an information processing terminal 15, and either the information processing terminal 15 or a server 16 automatically executes setting in accordance with predetermined standards.

Figure 8:
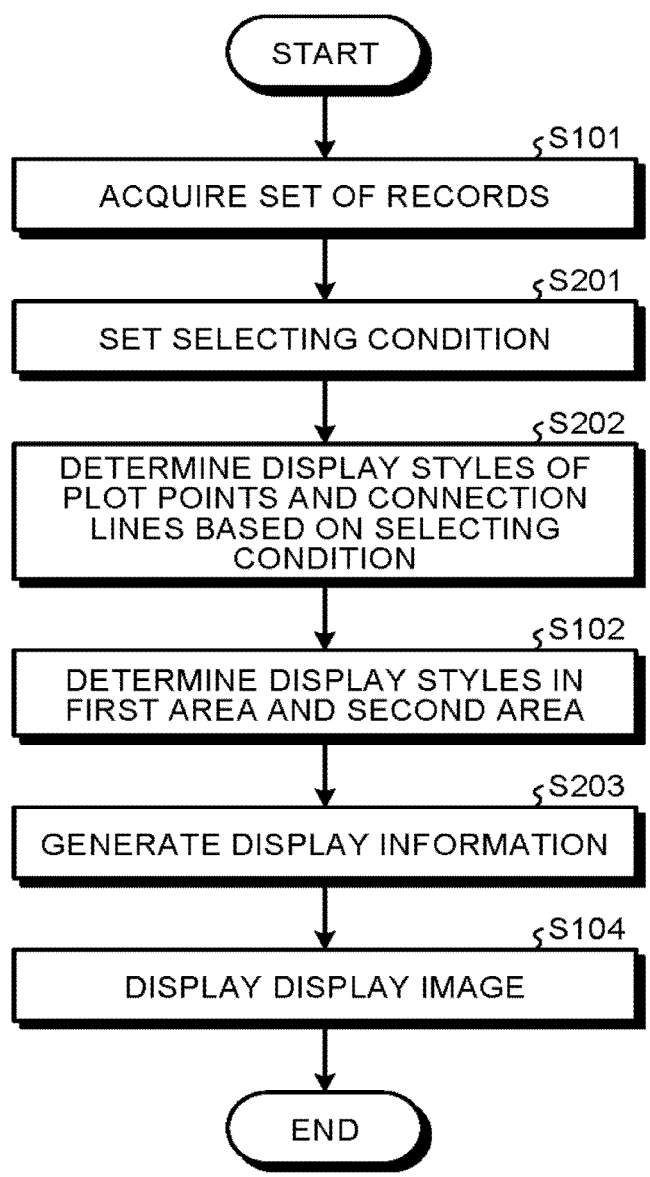

FIG. 8 a flowchart illustrating an exemplary processing flow by the information generation system 101 according to the second embodiment. First in Step S101, the set of record 31 is acquired in the same manner as the above-described first embodiment, and then a selecting condition is set by the setting unit 104 (S201). The generation unit 12 determines display styles of plot points 81A to 87D and connection lines 91A to 91D based on the selecting condition (S202). At this point, the generation unit 12 differentiates the display styles of the plot points 81A to 87D and the connection lines 91A to 91D complying with the selecting condition from the display styles of the plot pints 81A to 87D and the connection lines 91A to 91D not complying with the selecting condition.

Next, display styles in a first area 62 and a second area 63 are determined in the same manner as the first embodiment (S102). The generation unit 12 generates display information based on the display styles of the plot points 81A to 87D and the connection lines 91A to 91D and the display styles in the first area 62 and the second area 63 (S203). Based on the generated display information, a control unit 13 causes a display unit to display a display image in which the display styles determined in Step S202 for the plot points 81A to 87D and the connection lines 91A to 91D are reflected (S104).

Figure 9:
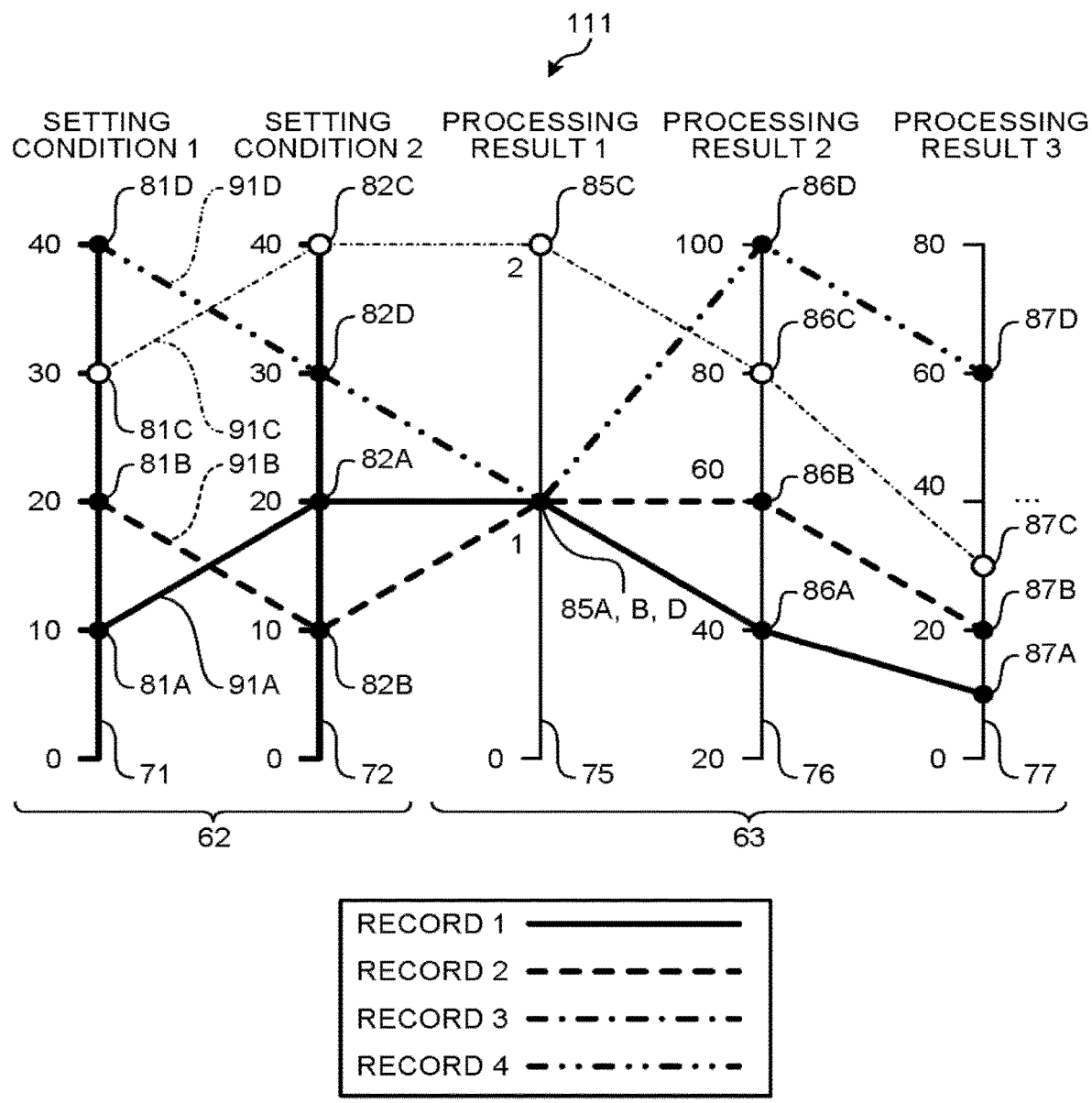
FIG. 9 is a diagram illustrating an exemplary display image according to the second embodiment.

FIG. 9 is a diagram illustrating an exemplary display image 111 according to the second embodiment. The present example is a case where the selecting condition is "a concrete value of the second setting condition 52 is 30 or less". According to the present example, thicknesses of plot points 81C to 87C and the connection line 91C corresponding to the third record 43 not complying with the selecting condition are thinner than thicknesses of plot points 81A to 87A, 81B to 87B, 81D to 87D and connection lines 91A, 91B, 91D complying with the selecting condition. Meanwhile, the display styles are not limited to the present example, and differentiation can be achieved by line types, colors, brightness, blinking, etc., for example.

Figure 10:
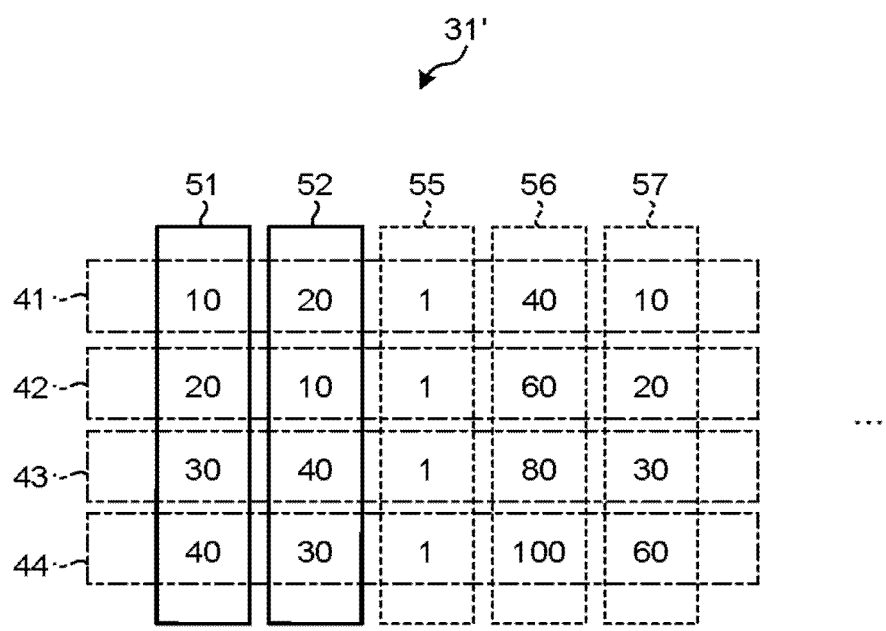
FIG. 10 is a diagram illustrating an exemplary set of records according to another example of the second embodiment.

FIG. 10 is a diagram illustrating an exemplary set of record 31' according to another example of the second embodiment. According to the set of records 31 of the present example, all of concrete values in the first processing result 55 are "1".

Figure 11:
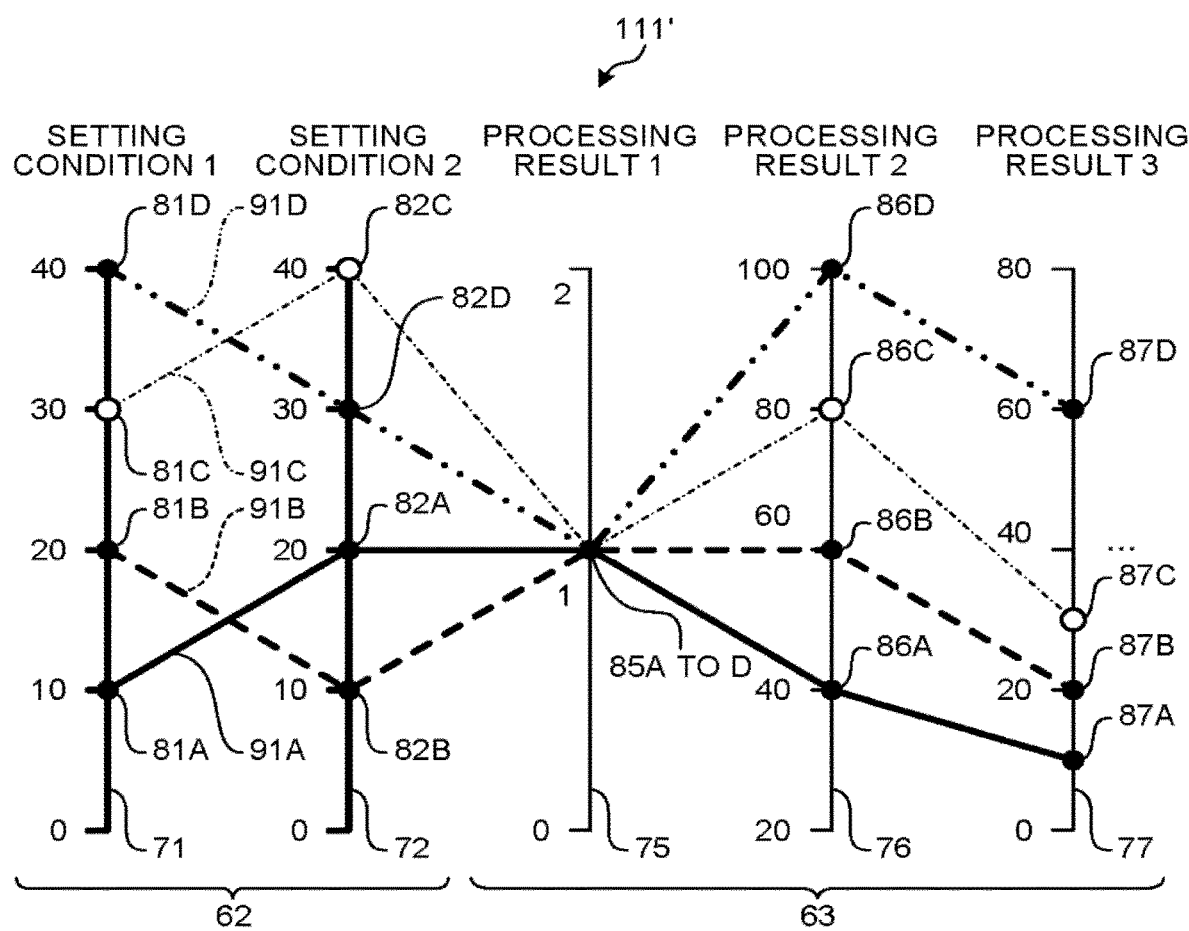
FIG. 11 is a diagram illustrating an exemplary display image corresponding to the set of records illustrated is FIG. 10.

FIG. 11 is a diagram illustrating an exemplary display image 111' corresponding to the set of records 31' illustrated in FIG. 10. According to the present example, since all of the concrete values in the first processing result 55 are "1", all of plot points 85A to 85D concentrate on one point. Thus, in the case where the plot point 853 not complying with the above selecting condition overlaps the plot points 85A, 85B, 85D complying with the same condition, it is preferable to prioritize the display style of the plot points 85A, 85B, 85D.

According to the present embodiment, it is possible to provide display in which a user can easily grasp only a processing result complying with a condition desired by the user.

Third Embodiment

Figure 12:
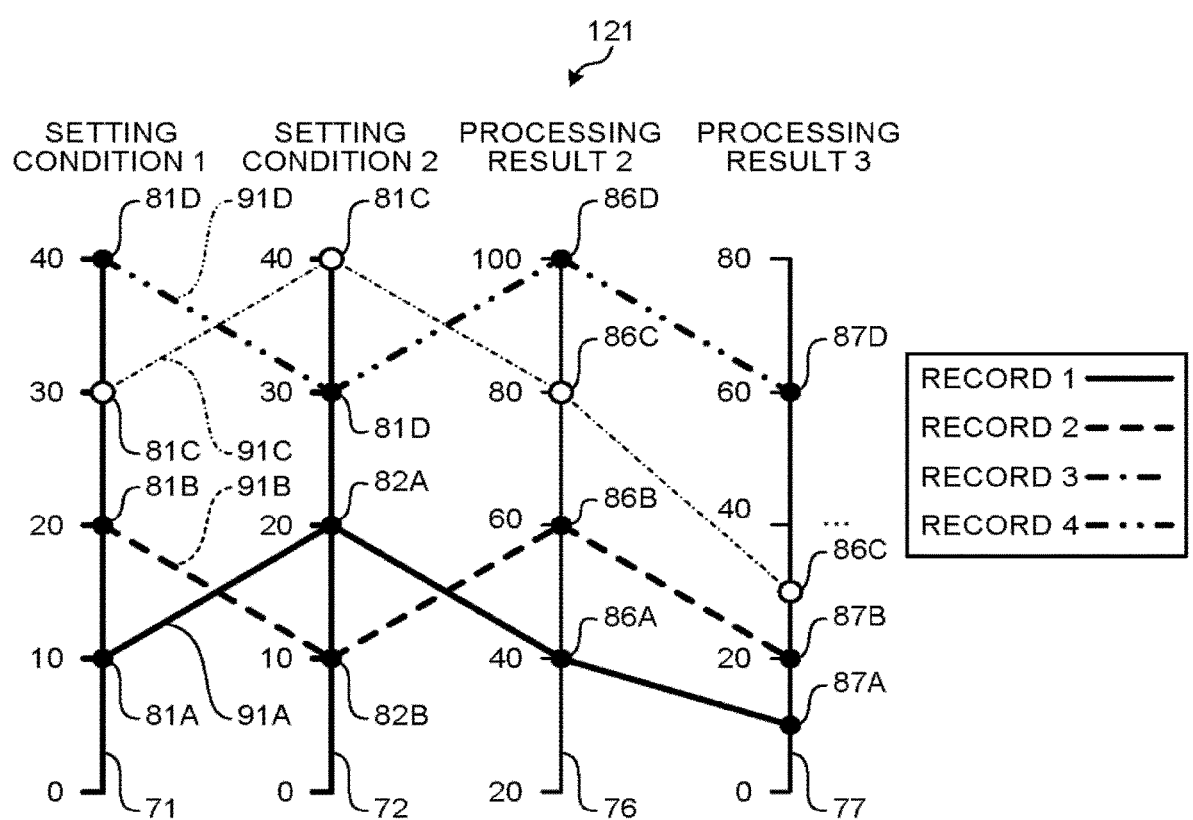
FIG. 12 is a diagram illustrating an exemplary display image according to a third embodiment.

FIG. 12 is a diagram illustrating an exemplary display image 121 according to a third embodiment. The display image 121 according to the present embodiment is an image based on a set of records 31' illustrated in FIG. 13 same as a display image 111' illustrated in FIG. 11. Comparing the display image 111' with the display image 121, a first processing result axis 75 corresponding to a first processing result is not displayed on the display image 121 according to the present embodiment.

A generation unit 12 according to the present embodiment generates display information so as not to display setting condition axes 71, 72 or processing result axes 75 to 77 which satisfy a predetermined condition. The predetermined condition is whether all of plot points 81A to 81D, 82A to 82D, 85A to 85D, 86A to 86D, 87A to 87D displayed on the respective setting condition axes 71, 72 and the processing result axes 75 to 77 are located within a predetermined range. In the display image 111' illustrated in FIG. 11, all of the plot points 85A to 85D displayed on the first processing result axis 75 concentrate on one point, that is, are located within the predetermined range. In this case, the first processing result axis 75 not displayed as shown in the display image 121 illustrated FIG. 12.

According to the present embodiment, a user can appropriately and easily grasp a difference of correspondence relation in each test processing because information not needed to be compared is deleted.

Fourth Embodiment

Figure 13:
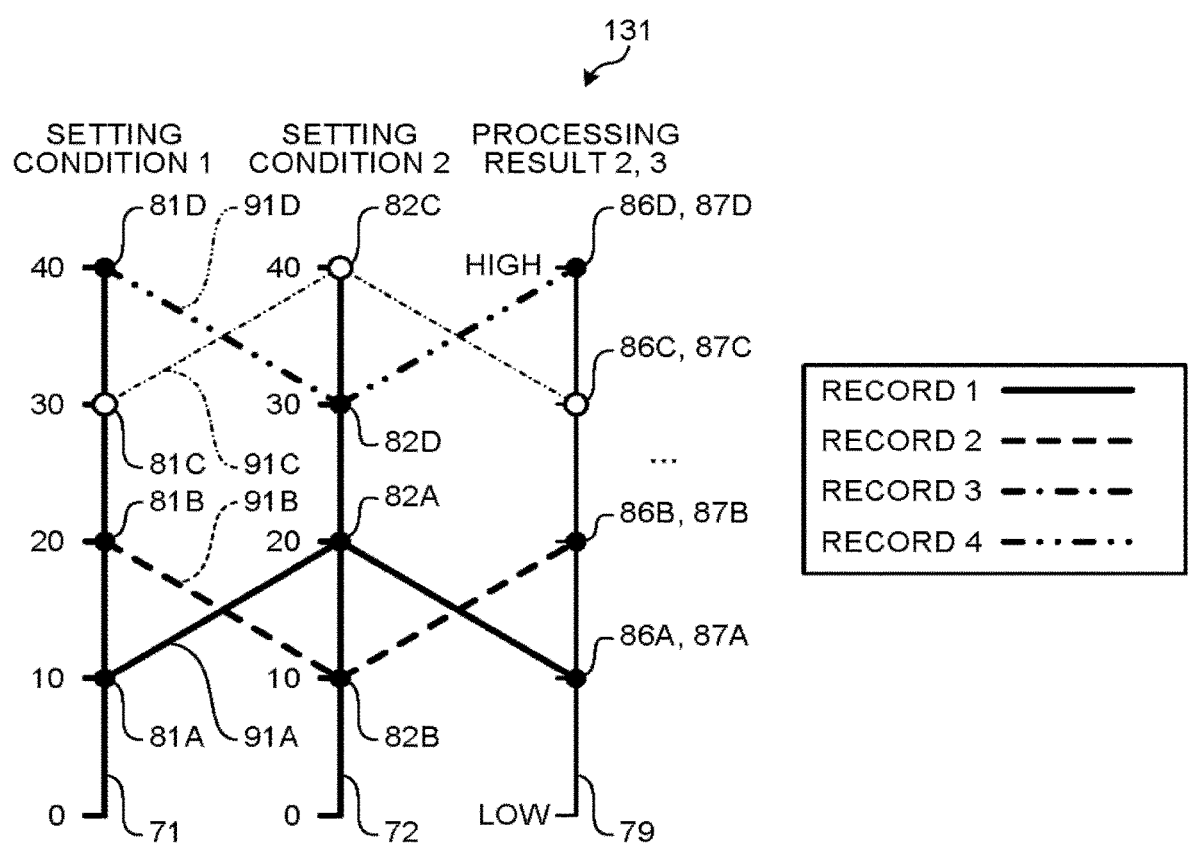
FIG. 13 is a diagram illustrating an exemplary display image according to a fourth embodiment.

FIG. 13 is a diagram illustrating an exemplary display image 131 according to a fourth embodiment. The display image 131 according to the present embodiment is an image based on a set of records 31' illustrated in FIG. 10 same as a display image 111" illustrated in FIG. 11 and a display image 121 illustrated in FIG. 12. Comparing the display image 121 with the display image 131, a second processing result axis 76 and a third processing result axis 77 are integrated and represented as one fourth processing result axis in the display image 131 according to the present embodiment.

A generation unit 12 according to the present embodiment generates display information so as to integrally display the processing result axes 75 to 77 satisfying a predetermined condition. The predetermined condition is whether all of connection lines 91A to 91D displayed between the adjacent two processing result axes 75 to 77 intersect or not. According to the display image 121 illustrated in FIG. 12, all of the connection lines 91A to 91D displayed between the second processing result axis 76 and the third processing it axis 77 do not intersect. In other words, alignment order of plot points 86A to 86D on the second processing result axis 76 coincides with alignment order of plot points 87A to 87D on the third processing result axis 77. In this case, the second processing result axis 76 and the third processing result axis 77 are integrated and displayed as the one fourth processing result axis 79 as shown in the display image 131 illustrated in FIG. 13. Meanwhile, preferably, determination on whether connection lines intersect or not is performed only for the connection lines complying with the setting condition (in the present example, connection lines 91A, 91B, 91D).

Figure 14:
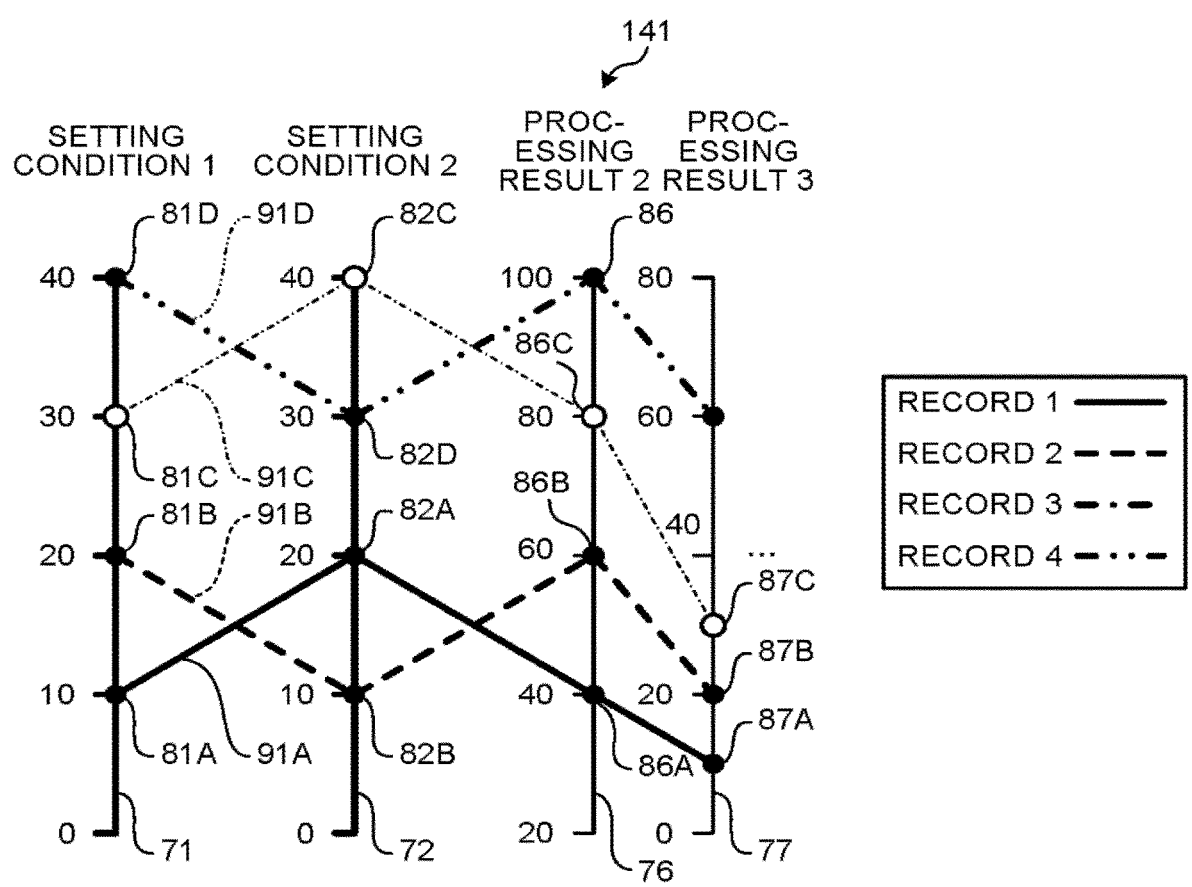
FIG. 14 is a diagram illustrating an exemplary display image according to another example of the fourth embodiment.

FIG. 14 is a diagram illustrating an exemplary display image 141 according to another example of the fourth embodiment. In the present example, the second processing result axis 76 and the third processing result axis 77 are separately displayed, but a distance between the two axes 76, 77 is narrow. Thus, as a method to integrate the two processing result axes 76, 77 having the connection lines 91A to 91D not intersecting, there is a method in which the two processing result axes 76, 77 are displayed by narrowing the distance between the two axes as shown in the display image 141 illustrated in FIG. 14, for example, in addition to the method of displaying one processing result axis 79 as shown in the display image 131 illustrated in FIG. 13.

According to the present embodiment, a user can appropriately and easily grasp a main portion of a test processing result because a change of a concrete value not affecting a general situation is excluded or representation can be provided in a simplified manner.

Fifth Embodiment

FIG. 15 is a diagram illustrating an exemplary display image 151 according to a fifth embodiment. The display image 151 according to the present embodiment represents a display image 111", namely, a parallel coordinate plot illustrated in FIG. 11 as a radar chart.

In this hind of graph form also, effects same as other embodiments described above can be achieved.

While certain embodiments have been described, these embodiments have been presented by way of example only, and are not intended to limit the scope of the inventions. Indeed, the novel embodiments described herein may be embodied in a variety of other forms; furthermore, various omissions, substitutions and changes in the form of the embodiments described herein may be made without departing from the spirit of the inventions. The accompanying claims and their equivalents are intended to cover such forms or modifications as would fall within the scope and spirit of the inventions.

What is claimed is:

1. A system to generate information related to processing of a target module which outputs a processing result in accordance with a setting condition, the system comprising:
    circuitry configured to:
        acquire a set of records, each of which indicates a correspondence relation between the setting condition and the processing result for each of the processing of the target module, each record containing a setting condition and a processing result corresponding to each other;
        generate display information for generating a display image indicating the correspondence relation for each record based on the set of records;
        control a display so as to display the display image based on the display information; and
        set a selecting condition to make search refinement to concrete values of the setting condition and/or concrete values of the processing result in the set of records, wherein
    the display image is a parallel coordinate plot that includes
        a first area to display the setting condition and a second area to display the processing result,
        one or more setting condition axes each indicating a kind of the setting condition displayed in the first area,
        one or more processing result axes displayed in parallel to the setting condition axes, each of the processing result axes indicating a kind of the processing result displayed in the second area,
        one or more value objects each indicating the concrete value of the setting condition displayed at the setting condition axes,
        one or more of value objects each indicating the concrete value of the processing result displayed at the processing result axes, and
        a relation object connecting between a value object on the setting condition axis and a value object on the processing results axis for each record,
    the circuitry is further configured to generate the display information such that a first display style differs from a second display style,
    the first display style represents display styles of the value object and the relation object of a record which includes the setting condition or the processing result not complying with the selecting condition,
    the second display style represents display styles of the value object and the relation object of another record which does not include the setting condition or the processing result not complying with the selecting condition,
    each of the value objects is depicted by a plot point at the corresponding concrete value on the corresponding axis, and
    the display style of the value object represented by the first display style is differentiated from the display style of the value object represented by the second display style by at least one of line types, colors, brightness, and blinking of the plot points.

2. The information generation system according to claim 1, wherein a display style of the first area differs from a display style of the second area such that the first area and the second area become identifiable.

3. The information generation system according to claim 1, wherein in the case where a difference between the respective concrete values indicated by all of the value objects on the one processing result axis are located within a predetermined range, the circuitry is configured to generate the display information so as not to display the one processing result axis.

4. The information generation system according to claim 1, wherein in the case where all of the relation objects displayed between two adjacent processing result axes do not intersect, the circuitry is configured to generate the display information so as to integrally display the two adjacent processing result axes.

5. The information generation system according to claim 1, wherein the target module is hardware.

6. The information generation system according to claim 1, wherein the target module is software.

7. The information generation system according to claim 1, further comprising:
    an information processing terminal used by a user; and
    a server connected to the information processing terminal via a network, wherein
    at least a part of processing to generate the display information is executed by the server, and
    the display image is displayed on the display of the information processing terminal.

8. The information generation system according to claim 1, wherein
    the processing of the target module is processing of performing a test for operation of the target module, and
    the processing result is information representing a simulation result of the target module under the corresponding setting condition.

9. A method to generate information, by a computer, related to processing of a target module which outputs a processing result in accordance with a setting condition, the method comprising:
- acquiring a set of records, each of which indicates a correspondence relation between the setting condition and the processing result for each of the processing of the target module, each record containing a setting condition and a processing result corresponding to each other;
- generating display information for generating a display image indicating the correspondence relation for each record based on the set of records;
- controlling a display so as to display the display image based on the display information; and
- setting a selecting condition to make search refinement to concrete values of the setting condition and/or concrete values of the processing result in the set of records, wherein
- the display image is a parallel coordinate plot that includes
  - a first area to display the setting condition and a second area to display the processing result,
  - one or more setting condition axes each indicating a kind of the setting condition displayed in the first area,
  - one or more processing result axes displayed in parallel to the setting condition axes, each of the processing result axes indicating a kind of the processing result displayed in the second area,
  - one or more value objects each indicating the concrete value of the setting condition displayed at the setting condition axes,
  - one or more of value objects each indicating the concrete value of the processing result displayed at the processing result axes, and
  - a relation object connecting between a value object on the setting condition axis and a value object on the processing results axis for each record,
- the method further comprises generating the display information such that a first display style differs from a second display style,
- the first display style represents display styles of the value object and the relation object of a record which includes the setting condition or the processing result not complying with the selecting condition,
- the second display style represents display styles of the value object and the relation object of another record which does not include the setting condition or the processing result not complying with the selecting condition,
- each of the value objects is depicted by a plot point at the corresponding concrete value on the corresponding axis, and
- the display style of the value object represented by the first display style is differentiated from the display style of the value object represented by the second display style by at least one of line types, colors, brightness, and blinking of the plot points.

10. The method according to claim 9, wherein a display style of the first area differs from a display style of the second area such that the first area and the second area become identifiable.

11. The method according to claim 9, further comprising:
- in the case where a difference between the respective concrete values indicated by all of the value objects on the one processing result axis are located within a predetermined range, generating the display information so as not to display the one processing result axis.

12. The method according to claim 9, further comprising:
- in the case where all of the relation objects displayed between two adjacent processing result axes do not intersect, generating the display information so as to integrally display the two adjacent processing result axes.

13. The method according to claim 9, wherein
- the processing of the target module is processing of performing a test for operation of the target module, and
- the processing result is information representing a simulation result of the target module under the corresponding setting condition.

14. A computer program product having a non-transitory computer readable medium including an information generation program causing a computer to generate information related to processing of a target module which outputs a processing result in accordance with a setting condition, the information generation program causing the computer to execute processing of:
- acquiring a set of records, each of which indicates a correspondence relation between the setting condition and the processing result for each of the processing of the target module, each record containing a setting condition and a processing result corresponding to each other;
- generating display information in for generating a display image indicating the correspondence relation for each record based on the set of records;
- controlling a display so as to display the display image based on the display information; and
- setting a selecting condition to make search refinement to concrete values of the setting condition and/or concrete values of the processing result in the set of records, wherein
- the display image is a parallel coordinate plot that includes
  - a first area to display the setting condition, and a second area to display the processing result,
  - one or more setting condition axes indicating kinds of the setting condition displayed in the first area,
  - one or more processing result axes displayed in parallel to the setting condition axes, the processing result axes indicating kinds of the processing result displayed in the second area,
  - one or more value objects indicating the concrete value of the setting condition displayed at the setting condition axes,
  - one or more of value objects indicating the concrete value of the processing result displayed at the processing result axes, and
  - a relation object connecting between a value object on the setting condition axis and a value object on the processing results axis for each record,
- the information generation program further causing the computer to execute processing of generating the display information such that a first display style differs from a second display style,
- the first display style represents display styles of the value object and the relation object of a record which includes the setting condition or the processing result not complying with the selecting condition,
- the second display style represents display styles of the value object and the relation object of another record which does not include the setting condition or the processing result not complying with the selecting condition, each of the value objects is depicted by a plot point at the corresponding concrete value on the corresponding axis, and the display style of the value object represented by the first display style is differentiated from the display style of the value object represented by the second display style by at least one of line types, colors, brightness, and blinking of the plot points.

15. The computer program product according to claim 14, wherein a display style of the first area differs from a display style of the second area such that the first area and the second area become identifiable.

16. The computer program product according to claim 14, wherein the information generation program causes the computer further to execute processing of:

in the case where a difference between the respective concrete values indicated by all of the value objects on the one processing result axis are located within a predetermined range, generating the display information so as not to display the one processing result axis.

17. The computer program product according to claim 14, wherein the information generation program causes the computer further to execute processing of:

in the case where all of the relation objects displayed between two adjacent processing result axes do not intersect, generating the display information so as to integrally display the two adjacent processing result axes.

18. The computer program product according to claim 14, wherein the processing of the target module is processing of performing a test for operation of the target module, and the processing result is information representing a simulation result of the target module under the corresponding setting condition.

* * * * *